United States Patent [19]
Lee

[11] Patent Number: 5,839,528
[45] Date of Patent: *Nov. 24, 1998

[54] DETACHABLE MOTORIZED WHEEL ASSEMBLY FOR A GOLF CART

[76] Inventor: John E. Lee, 3103 Lindenlea Drive, Mississauga, Ontario, Canada, L5C 2C3

[*] Notice: This patent issued on a continued prosecution application filed under 37 CFR 1.53(d), and is subject to the twenty year patent term provisions of 35 U.S.C. 154(a)(2).

[21] Appl. No.: 723,342

[22] Filed: Sep. 30, 1996

[51] Int. Cl.$^6$ ................................................ B62D 51/04
[52] U.S. Cl. .................. 180/16; 180/15; 180/19.1; 180/11; 280/DIG. 5; 280/DIG. 6
[58] Field of Search ................ 180/15, 16, 19.1, 180/19.2, 11; 280/DIG. 5, DIG. 6; 403/97, 102

[56] References Cited

U.S. PATENT DOCUMENTS

| | | | |
|---|---|---|---|
| D. 347,505 | 5/1994 | Machen et al. | 280/62 |
| 2,470,272 | 5/1949 | Trimmer | 280/DIG. 6 |
| 2,575,930 | 11/1951 | Schwartz | 280/DIG. 5 |
| 3,094,185 | 6/1963 | Racoosin | 180/19.1 |
| 3,561,555 | 2/1971 | Carmichael | 180/19.2 |
| 3,948,332 | 4/1976 | Tyner | 180/19.1 |
| 4,105,084 | 8/1978 | Baak | 180/11 |
| 4,570,731 | 2/1986 | Oaks | 280/DIG. 5 |
| 4,615,406 | 10/1986 | Botten-Schein et al. | 180/19 |
| 4,886,297 | 12/1989 | Levine | 280/87.042 |
| 4,974,807 | 12/1990 | Moineau | 280/DIG. 5 |
| 5,161,635 | 11/1992 | Kiffe | 280/DIG. 5 |
| 5,180,023 | 1/1993 | Reimers | 180/19 |
| 5,232,065 | 8/1993 | Cotton | 180/11 |
| 5,375,673 | 12/1994 | McCall et al. | 180/13 |
| 5,526,894 | 6/1996 | Wang | 280/DIG. 5 |

FOREIGN PATENT DOCUMENTS

| | | | |
|---|---|---|---|
| 722429 | 1/1955 | United Kingdom | 280/DIG. 6 |

*Primary Examiner*—Richard M. Camby
*Assistant Examiner*—Gary Savitt

[57] ABSTRACT

A detachable motorized wheel assembly for a golf cart has a support framework removably attachable to the rear section of a golf cart of the type having oppositely disposed and spaced apart wheels. The assembly includes a motor driven wheel positioned between and rearward of the spaced apart wheels of the golf cart. The assembly further includes a golf bag support device having a number of support loops. Each loop having a first section outwardly disposed from the top of the support framework. Each loop further having a second section disposed upwardly from the first section to form an obtuse angle between the first and second sections.

10 Claims, 4 Drawing Sheets

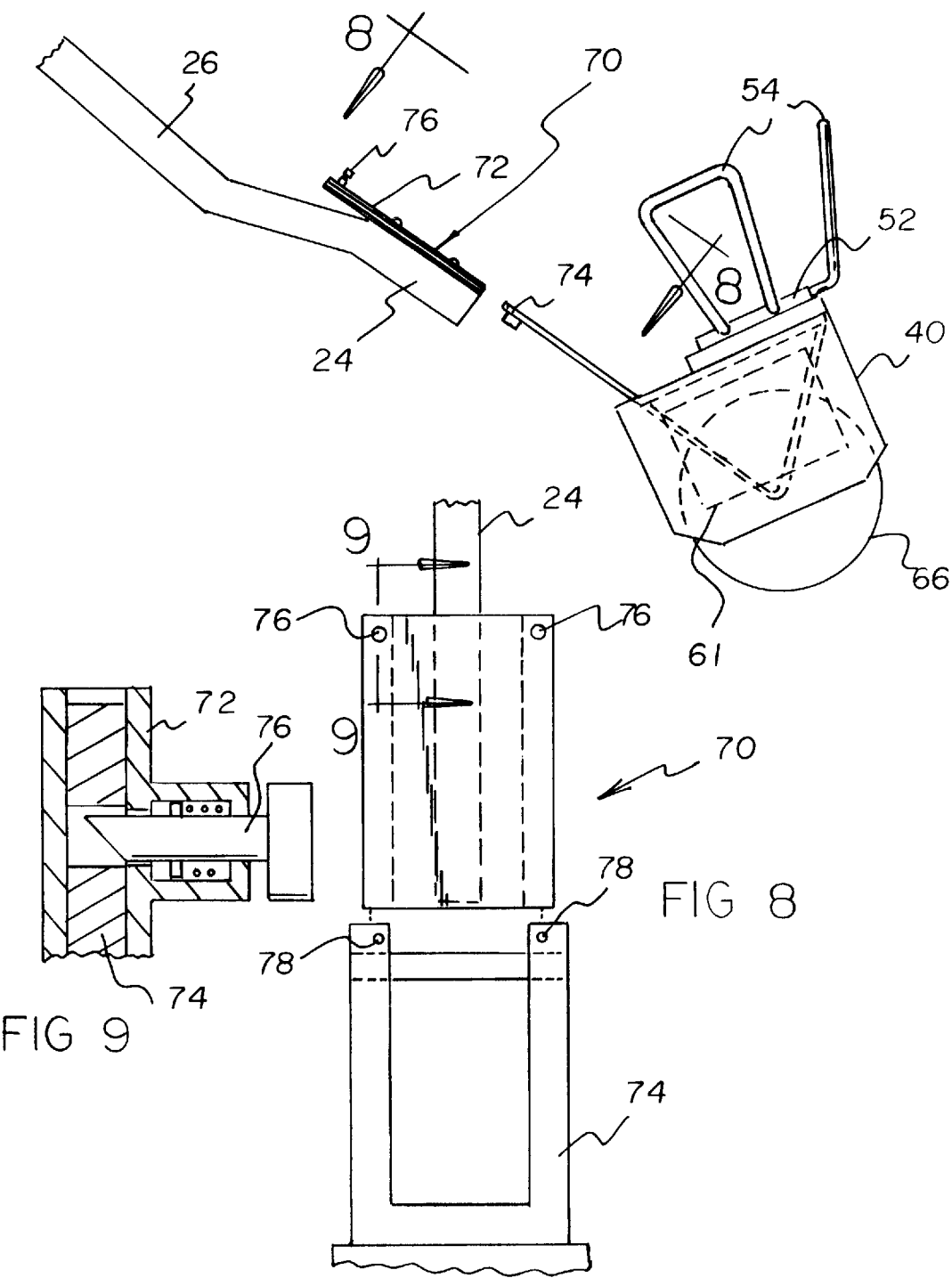

DETACHABLE MOTORIZED WHEEL ASSEMBLY FOR A GOLF CART

BACKGROUND OF THE INVENTION

1. Field of the Invention

The present invention relates to Golf Bag Cart Drive Devices and more particularly pertains to a new detachable motorized wheel assembly for a golf cart for providing an efficient attachable/detachable drive means to a conventional pull-type golf cart thereby reducing the physical discomfort associated with manually manipulating the golf cart.

2. Description of the Prior Art

The use of Golf Bag Cart Drive Devices is known in the prior art. More specifically, Golf Bag Cart Drive Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Golf Bag Cart Drive Devices include U.S. Pat. No. 5,375,673; U.S. Pat. No. 5,180,023; U.S. Design Pat. No. 347,505; U.S. Pat. No. 5,232,065; U.S. Pat. No. 4,615,406 and U.S. Pat. No. 4,105,084.

While these devices fulfill their respective, particular objectives and requirements, the aforementioned patents do not disclose a new detachable motorized wheel assembly for a golf cart. The inventive device includes a conventional pull-type golf cart having a handle and a connecting end opposite of the handle, a universal securing means removably secured to the connecting end, a frame secured to the securing means, and a drive means secured within the frame providing the force necessary to move the conventional pull-type golf cart.

In these respects, the detachable motorized wheel assembly for a golf cart according to the present invention substantially departs from the conventional concepts and designs of the prior art, and in so doing provides an apparatus primarily developed for the purpose of providing an efficient attachable/detachable drive means to a conventional pull-type golf cart thereby reducing the physical discomfort associated with manually manipulating the golf cart.

SUMMARY OF THE INVENTION

In view of the foregoing disadvantages inherent in the known types of Golf Bag Cart Drive Devices now present in the prior art, the present invention provides a new detachable motorized wheel assembly for a golf cart construction wherein the same can be utilized for providing an efficient attachable/detachable drive means to a conventional pull-type golf cart thereby reducing the physical discomfort associated with manually manipulating the golf cart.

The general purpose of the present invention, which will be described subsequently in greater detail, is to provide a new detachable motorized wheel assembly for a golf cart apparatus and method which has many of the advantages of the Golf Bag Cart Drive Devices mentioned heretofore and many novel features that result in a new detachable motorized wheel assembly for a golf cart which is not anticipated, rendered obvious, suggested, or even implied by any of the prior art Golf Bag Cart Drive Devices, either alone or in any combination thereof.

To attain this, the present invention generally comprises a conventional pull-type golf cart having a handle and a connecting end opposite of the handle, a universal securing means removably secured to the connecting end, a frame secured to the securing means, and a drive means secured within the frame providing the force necessary to move the conventional pull-type golf cart.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments including for pro golf shop rental pull carts; and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new detachable motorized wheel assembly for a golf cart apparatus and method which has many of the advantages of the Golf Bag Cart Drive Devices mentioned heretofore and many novel features that result in a new detachable motorized wheel assembly for a golf cart which is not anticipated, rendered obvious, suggested, or even implied by any of the prior art Golf Bag Cart Drive Devices, either alone or in any combination thereof.

It is another object of the present invention to provide a new detachable motorized wheel assembly for a golf cart which may be easily and efficiently manufactured and marketed.

It is a further object of the present invention to provide a new detachable motorized wheel assembly for a golf cart which is of a durable and reliable construction.

An even further object of the present invention is to provide a new detachable motorized wheel assembly for a golf cart which is susceptible of a low cost of manufacture with regard to both materials and labor, and which accordingly is then susceptible of low prices of sale to the consuming public, thereby making such detachable motorized wheel assembly for a golf cart economically available to the buying public.

Still yet another object of the present invention is to provide a new detachable motorized wheel assembly for a golf cart which provides in the apparatuses and methods of the prior art some of the advantages thereof, while simultaneously overcoming some of the disadvantages normally associated therewith.

Still another object of the present invention is to provide a new detachable motorized wheel assembly for a golf cart for providing an efficient attachable/detachable drive means to a conventional pull-type golf cart thereby reducing the physical discomfort associated with manually manipulating the golf cart.

Yet another object of the present invention is to provide a new detachable motorized wheel assembly for a golf cart which includes a conventional pull-type golf cart having a handle and a connecting end opposite of the handle, a universal securing means removably secured to the connecting end, a frame secured to the securing means, and a drive means secured within the frame providing the force necessary to move the conventional pull-type golf cart.

Still yet another object of the present invention is to provide a new detachable motorized wheel assembly for a golf cart that goes forward or reverse allowing the user to push or pull the conventional pull-type golf cart.

Even still another object of the present invention is to provide a new detachable motorized wheel assembly for a golf cart that has a low and controllable center of gravity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an alternative embodiment disclosing a mounted securing means.

FIG. 8 is a cross sectional view taken along line 8—8 of FIG. 7.

FIG. 9 is a cross sectional view taken along line 9—9 of FIG. 8.

DESCRIPTION OF THE PREFERRED EMBODIMENT

Figure 1:
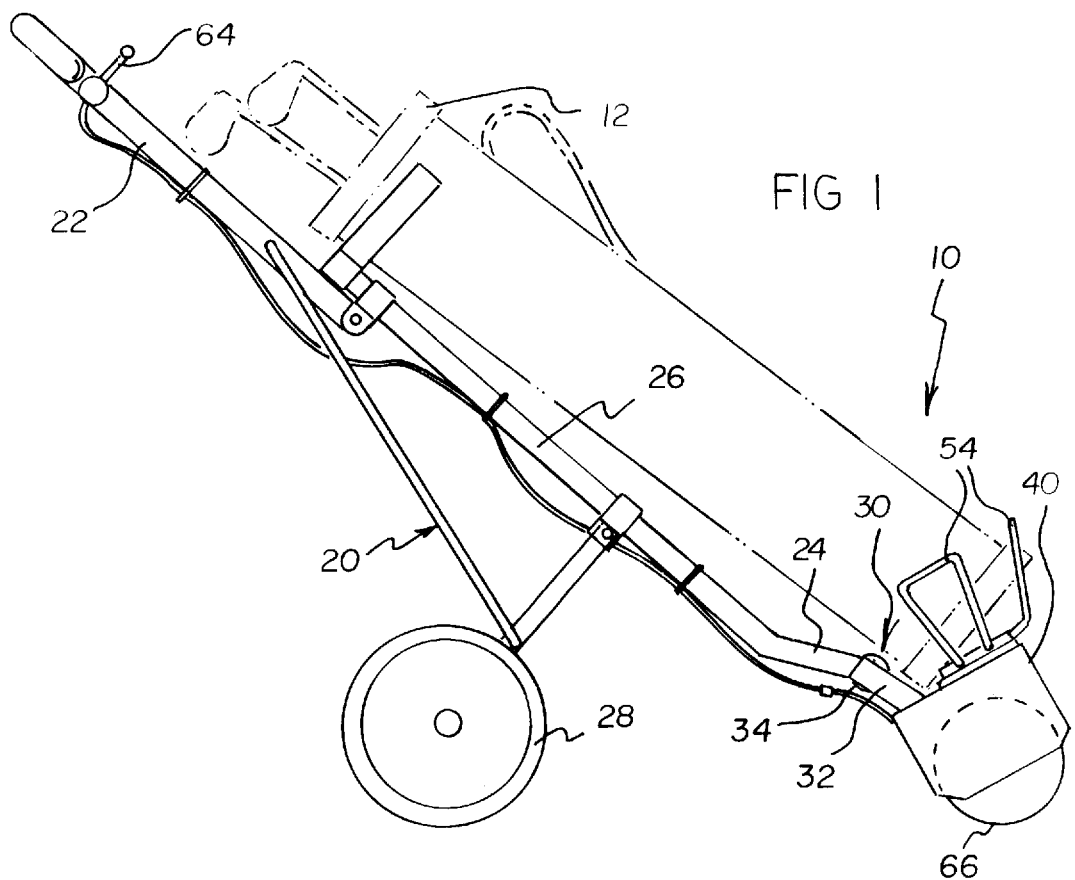
FIG. 1 is a side view of a new detachable motorized wheel assembly for a golf cart according to the present invention.

With reference now to the drawings, and in particular to FIGS. 1 through 9 thereof, a new detachable motorized wheel assembly for a golf cart embodying the principles and concepts of the present invention and generally designated by the reference numeral 10 will be described.

More specifically, it will be noted that the detachable motorized wheel assembly for a golf cart 10 comprises a universal securing means 30 removably attached to a connecting end 24 of an elongated support member 26 from a conventional pull-type golf cart 20, a frame 40 secured to the universal securing means 30, and a drive means 60 secured within the frame 40 providing the selected motion desired.

Figure 5:
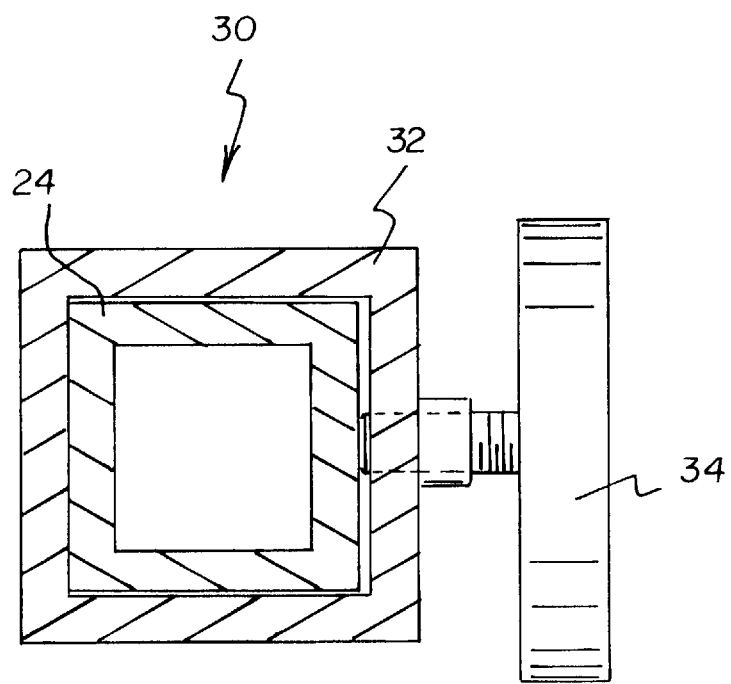
FIG. 5 is a cross sectional view taken along line 5—5 of FIG. 4.

As best illustrated in FIG. 5, it can be shown that the universal securing means 30 has a hollow coupling member 32 secured at one end to the frame 40. A tightening fastener 34 threadably projects through the end of the hollow coupling member 32 opposite of the frame 40. The tightening fastener 34 frictionally engages the connecting end 24 thereby preventing the hollow coupling member 32 from becoming disengaged.

Figure 3:
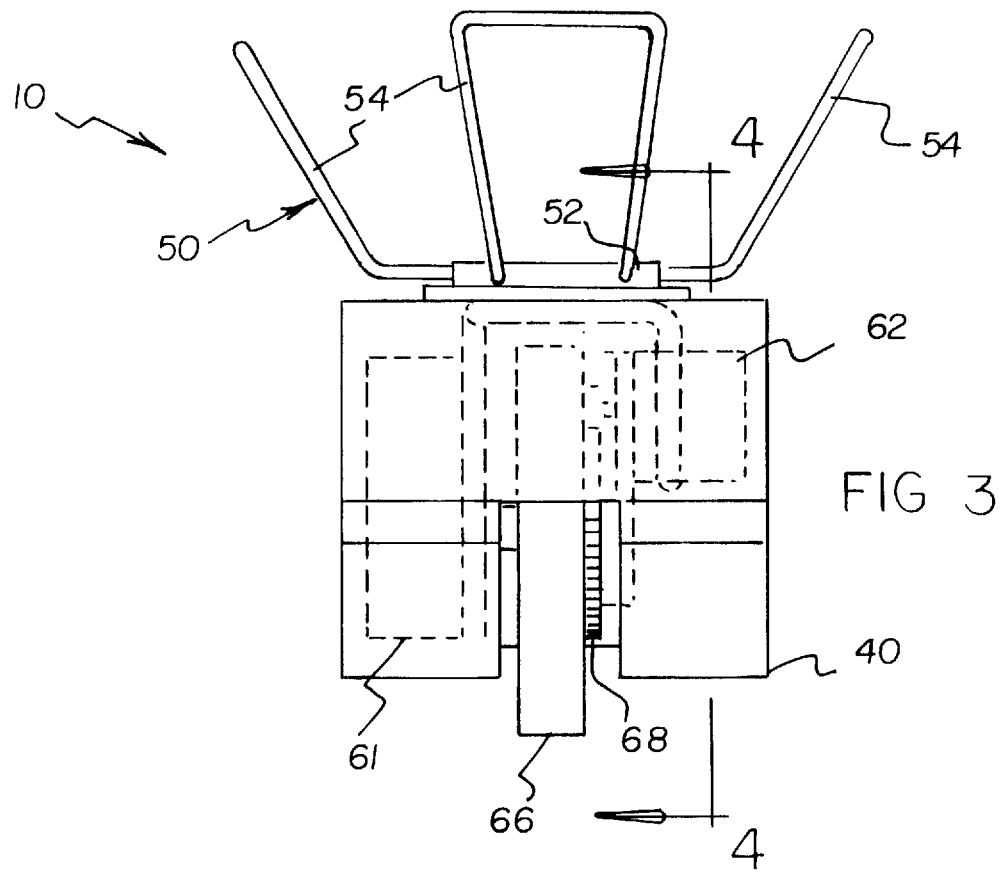
FIG. 3 is a cross sectional view taken along line 3—3 of FIG. 2.
Figure 4:
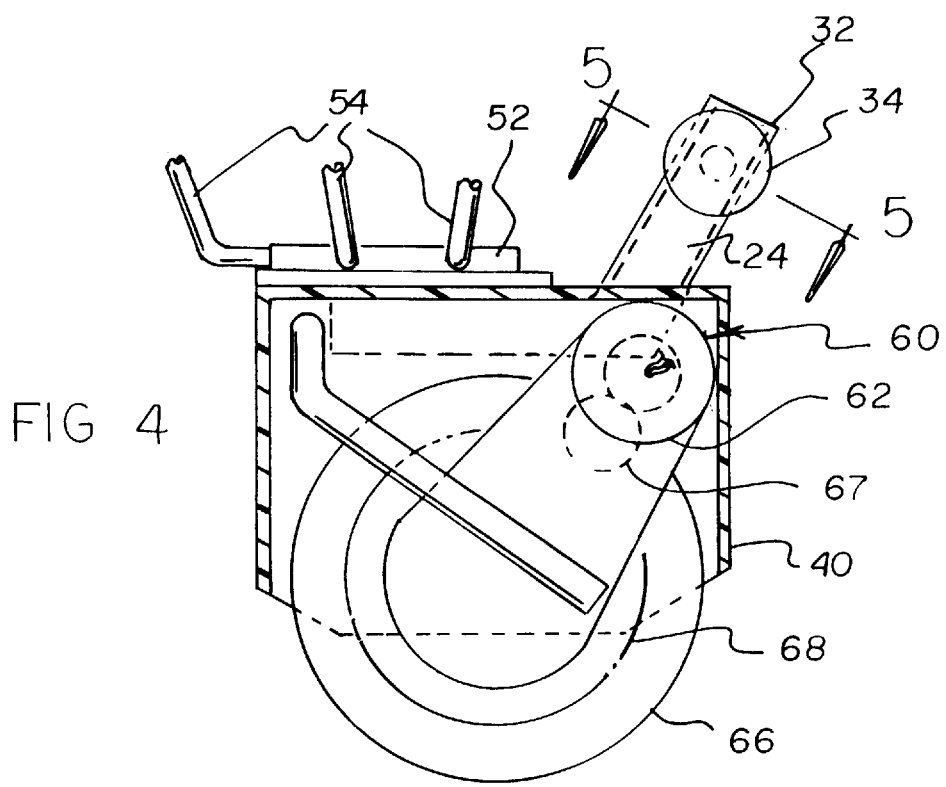
FIG. 4 is a cross sectional view taken along line 4—4 of FIG. 3.
Figure 6:
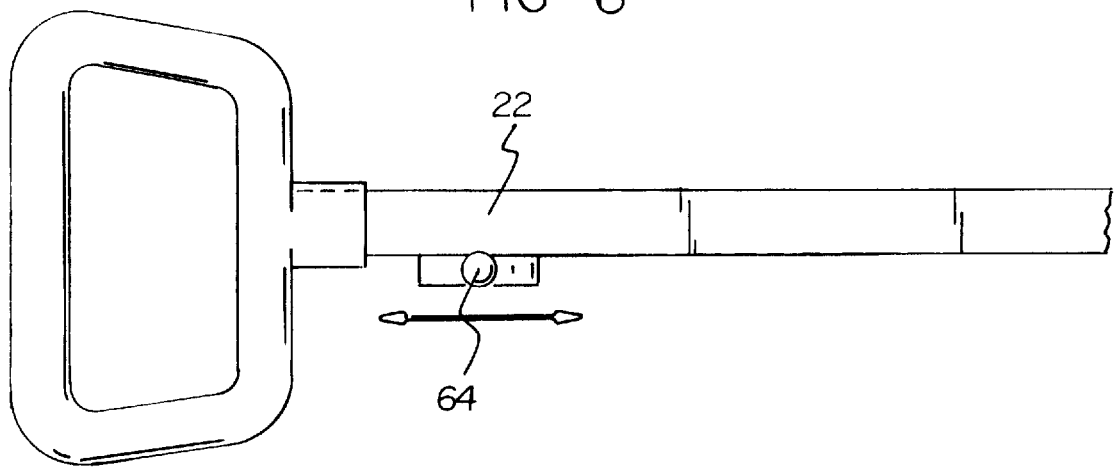
FIG. 6 is a top view of the switch secured to the handle.

As best shown in FIGS. 3–4, the drive means 60 has a power source 61. A switch 64 is electrically coupled to the power source 61 and secured to a handle 22 of the conventional pull-type golf cart 20. A motor 62 is electrically coupled to the switch 64 and secured to the frame 40. A conversion gear 67 is rotatably secured to the frame 40 and engages the motor 62. A drive wheel 66 is rotatably secured to the frame 40. A drive gear 68 is secured to the side of the drive wheel 66 and engages the conversion gear 67 thereby transferring the torque from the motor 62 to the drive wheel 66.

Figure 2:
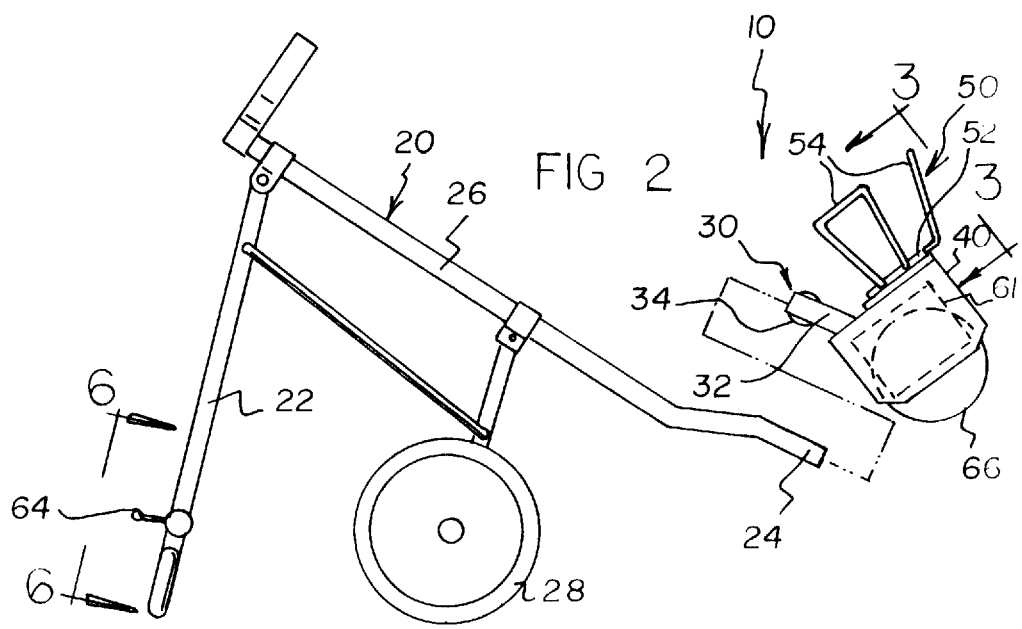
FIG. 2 is an isometric side view of the present invention.

As shown in FIGS. 1–2, a golf bag support means 50 is secured to the cornice of the frame 40, thereby supporting a golf bag 12 secured to the conventional pull-type golf cart 20. The golf bag support means has a base 52 secured to the cornice of the frame 40 with a plurality of support loops 54 projecting substantially orthogonal to the base 52 to capture the golf bag 12.

In an alternative embodiment as shown in FIGS. 7 through 9 of the drawings, a mounted securing means 70 replaces the universal securing means 30. The mounted securing means 30 includes a slotted bar 72 secured to said connecting end 24. A U-shaped member 74 is secured to the frame 40 at the closed end. The open end of the U-shaped member 74 slidably couples to the slotted bar 72. An aperture 78 is positioned into the extended end of said U-shaped member 74. A locking pin 76 is springly secured to the slotted bar 72 and removably projecting through the aperture 78.

In use, the motor 62 provides torque to the conversion gear 67 which reduces the rotational speed to the drive gear 68. The drive gear is secured to the drive wheel 66 thereby rotating the drive wheel 66 which is in engagement with the ground. The user may selectively choose forward or reverse by manually manipulating the switch 64, thereby determining whether the user is in the push or pull position in relation to the conventional pull-type golf cart 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A power drive apparatus for moving a golf bag cart having a pair of oppositely disposed and laterally spaced apart wheels and a longitudinally-extending supporting frame member having a rear end section, said apparatus comprising:

a support framework for attachment to the rear end section of a supporting frame member of said golf bag cart behind said laterally-spaced apart wheels;

means for removably attaching said support framework to said rear end section, at least part of said attaching means being connected to said support framework; and drive means mounted on said support framework for moving said golf bag cart along the ground, said drive means including a drive wheel rotatably mounted to said support framework and a motor operatively connected to said drive wheel for rotating same, wherein in use of said apparatus, said drive wheel is mounted substantially rearwardly of said spaced apart wheels; and a golf bag support device attached to the support framework, the support device including three substantially rigid support loops, the support loops having a first section disposed outwardly from a top of the support framework substantially perpendicular to the drive wheel, the support loops further having a second section projecting upwardly from the first section to form an obtuse angle between the first section and the second section, one of said support loops extending generally rearwardly from the top of the support framework and the other two support loops extending in generally opposite lateral directions from the top of the support framework for producing a basket for receiving and embracing a lower end of a golf bag mounted on the golf bag cart ; and wherein said attaching means includes a securing mechanism attachable to said rear end section of the supporting frame member and a cooperating attachment member connected to said support framework and adapted to slidably engage said securing mechanism in order to attach said support framework to said golf bag cart; and wherein said securing mechanism is a slotted bar having a movable locking pin mounted thereon and said attachment member is a U-shaped member having a closed end and an open end, said closed end being secured to said support framework and said open end sized to slidably receive said slotted bar, and wherein said U-shaped member has an aperture adapted to receive said locking pin when said U-shaped member is full engaged with said slotted bar.

2. A power drive apparatus according to claim 1 wherein said drive means includes an electric power source, a switch mountable on said golf bag cart and capable of electrically connecting said power source to said motor in order to operate said motor, and a gearing arrangement operatively connected between said motor and said drive wheel.

3. A power drive apparatus according to claim 1 wherein said drive means includes an electric power source, and said motor and said power source are mounted on opposite sides of said drive wheel.

4. A power drive apparatus according to claim 2 wherein said gearing arrangement includes a conversion gear rotatably mounted in said framework and a drive gear that engages said conversion gear and is on one side of said drive wheel.

5. A power drive apparatus according to claim 2 wherein said drive means is capable of moving said golf bag cart selectively in a forward direction or in a reverse direction by operation of said switch.

6. A power drive apparatus for moving a golf bag cart having an elongate, central longitudinal supporting frame member and oppositely disposed and laterally-spaced apart rotatable wheels mounted on said frame member, said apparatus comprising:

a support framework for attachment to said cart at a rearward end of said supporting frame member, said support framework having golf bag support means for engaging and holding a bottom end of a golf bag;

means for attaching said support framework to a rear end section of said supporting frame member;

drive means mounted on said support framework for moving said golf bag cart along the ground, said drive means including a drive wheel rotatably mounted to said support framework and a motor operatively connected to said drive wheel for rotating same; and a golf bag support device attached to the support framework, the support device including three support loops, the support loops having a first section disposed outwardly from a top of the support framework substantially perpendicular to the drive wheel, the support loops further having a second section projecting upwardly from the first section to form an obtuse angle between the first section and the second section, one of said support loops extending generally rearwardly from the top of the support framework and the other two support loops extending in generally opposite lateral directions from the top of the support framework for producing a basket for receiving and embracing a lower end of a golf bag mounted on the golf bag cart; and wherein said attaching means includes a securing mechanism attachable to said rear end section of the supporting frame member and a cooperating attachment member connected to said support framework and adapted to slidably engage said securing mechanism in order to attach said support framework to said golf bag cart; and wherein said securing mechanism is a slotted bar having a movable locking pin mounted thereon and said attachment member is a U-shaped member having a closed end and an open end, said closed end being secured to said support framework and said open end sized to slidably receive said slotted bar, and wherein said U-shaped member has an aperture adapted to receive said locking pin when said U-shaped member is full engaged with said slotted bar.

7. A power drive apparatus according to claim 3 wherein said drive means includes an electric power source, a switch mountable on said golf bag cart and capable of electrically connecting said power source to said motor in order to operate said motor, and a gearing arrangement operatively connected between said motor and said drive wheel.

8. A power drive apparatus according to claim 7 wherein said electric power source and said motor are mounted on opposite sides of said drive wheel which is mounted centrally in said framework taken in a transverse direction.

9. A power drive apparatus according to claim 8 wherein said switch is adapted for mounting on a handle of said golf bag cart and is capable of operating said drive means selectively in a forward or a reverse direction.

10. A golf bag cart for moving a golf bag around a golf course, said cart comprising:

a golf bag cart apparatus including an elongate, central supporting frame member and oppositely disposed, spaced apart rotatable wheels mounted on said frame member, which has a rear end section;

a support framework attached to said rear end section and having means for engaging a bottom end of a golf bag; and means for attaching said support framework to said rear end section;

drive means mounted on said support framework for moving said golf bag cart along the ground, said drive means including a drive wheel rotatably mounted to said support framework and a motor operatively connected to said drive wheel for rotating same;

a golf bag support device attached to the support framework, the support device including three substantially rigid support loops, the support loops having a first section disposed outwardly from a top of the support framework substantially perpendicular to the drive wheel, the support loops further having a second section projecting upwardly from the first section to form an obtuse angle between the first section and the second section, one of said support loops extending generally rearwardly from the top of the support framework and the other two support loops extending in generally opposite lateral directions from the top of the support framework for producing a basket for receiving and embracing a lower end of a golf bag mounted on the golf bag cart; and wherein said drive means includes an electric power source, a switch mounted on a handle of said cart apparatus and capable of electrically connecting said power source to said motor in order to operate said motor and a gear arrangement operatively connected between said motor and said drive wheel; and wherein said attaching means includes a securing mechanism attachable to said rear end section of the supporting frame member and a cooperating attachment member connected to said support framework and adapted to slidably engage said securing mechanism in order to attach said support framework to said golf bag cart; and wherein said securing mechanism is a slotted bar having a movable locking pin mounted thereon and said attachment member is a U-shaped member having a closed end and an open end, said closed end being secured to said support framework and said open end sized to slidably receive said slotted bar, and wherein said U-shaped member has an aperture adapted to receive said locking pin when said U-shaped member is full engaged with said slotted bar.

* * * * *